Patented Oct. 28, 1947

2,429,946

UNITED STATES PATENT OFFICE 2,429,946

PROTECTIVE COATINGS

Edward Roach, Los Angeles, Calif., assignor, by mesne assignments, to William M. Farrer, Oscar A. Mellin, and Grace M. Correo, as trustees No Drawing. Application February 15, 1944, Serial No. 522,509

6 Claims. (Cl. 117—70)

This invention relates to insulating coatings for metallic surfaces and methods of applying the same.

Insulating coatings have been proposed for the surfaces of the steel plate construction of ships, but none of them has all of the desired characteristics of a satisfactory thermal coefficient of expansion, adhering to the iron or steel at temperatures above 1200° F., being fireproof and waterproof, being a non-conductor of electricity and a thermal insulator as well, not corrodible or otherwise unfavorably affected by ocean spray, and not sweating under conditions of high humidity. For example, paint peels and burns at high temperatures and gives off acrid products of decomposition; and in the case of compositions containing cork, the cork, even if it does not burst into flame, smolders and gives off smoke and fumes that have made it impossible for firefighting, repair, and rescue squads to enter and remain within spaces where the cork has been smoldering or undergoing decomposition by heat.

It is the principal object of this invention to provide coatings or coverings that avoid the disadvantages of prior coatings and have all of the desirable characteristics referred to above; to provide coatings that can be easily applied; to provide an effective method of applying such coatings; and other objects will be apparent on reading this specification.

I accomplish the objects of my invention by applying a sodium silicate cement, preferably in two coats, first a binder or foundation coat, and then a mastic coat upon the binder coat. The cement comprises a solid component and a liquid component. The solid component is high in silica with enough bases to form insoluble complex silicates with the the liquid component which is waterglass, preferably of about 38° Baumé and having a Na₂ to SiO₂ ratio of about 1 to 3.25. Water glass of other strengths and ratios may be used but that preferred is easily available and functions well.

The outer or mastic coat preferably includes asbestos, which is unnecessary in the binder coat.

Example 1

The coating composition comprises silica, an alkaline earth oxide, a fluoride, and waterglass. Calcined dolomite which is a mixture of calcium oxide and magnesium oxide is used as the alkaline earth oxide component, although other alkaline earth oxides or mixtures thereof may be used. Calcium fluoride is the fluoride used. The ingredients are thoroughly intermixed, and are preferably in finely divided form, the silica being preferably ground to a fineness of minus 200 mesh. The preferred proportions are, by weight, 1⅖ parts of silica, ⅕ part of calcined dolomite, and ⅕ part of calcium fluoride, or chemically equivalent proportions of equivalents. The proportions may be varied and still produce good results, but those given are preferred.

The intermixture above referred to is combined with the sodium silicate, in the proportion of 2 parts by weight of the dry mixture of silica, calcined dolomite, and calcium fluoride, to one part of the sodium silicate solution, in the following manner which should be followed for the best results. The dry mixture is added slowly and cautiously to the sodium silicate solution with constant agitation or stirring, until the 2 parts of dry mixture and one part of the sodium silicate solution have been thoroughly mixed. This results in a thick pasty mass. More of the sodium silicate solution is then added cautiously with constant agitation or stirring until the mass acquires the proper consistency for application by spraying under high pressure. This is applied to form the binder coat and upon which the mastic coat is superposed.

The paste for the mastic coat is prepared exactly in the same way as that for the binder coat, and asbestos, preferably of a grade known as 7B, is added thereto in the proportion of one part by weight of the asbestos for each four parts of the dry mixture used in the binder composition. This proportion of asbestos corresponds to about ten percent by weight of the composition for the binder coat. Enough of the sodium silicate solution is then added to lend to the mass the same consistency as the composition for the binder coat, so that it can be sprayed on under high pressure, the mass being first agitated or stirred until air bubbles are all expelled therefrom. This completes the making of the mastic composition.

The application of the binder and mastic compositions is as follows: The iron, steel or other metal surface is first cleaned if it is too dirty. The binder composition is sprayed thereonto and allowed to stand until pressure with the finger makes only a slight indentation. This requires about one hour. The mastic composition is then sprayed onto this partially set binder coat until the mastic coat is of the desired thickness. It is then allowed to stand for about seventy-two hours to cure. The coating is then given an acid treatment, preferably by spraying a weak solution of acid thereon. Any inorganic or organic acid may be used, provided it is not too weakly acid. Hydrochloric acid is preferred because it is a strong acid and any excess will evaporate. A solution made by diluting one part by volume of a strong solution of hydrochloric acid as purchased on the market with ten parts by volume of water may be used, but the strength of the acid can be varied considerably. After standing for about twenty-four hours the coating is completed. The completed coating is fireproof in that it does not burn, burst into flame, smolder, nor give off objectionable fumes at temperatures up to and above 1200° F.; it adheres to iron or other metal after being held for one hour at a temperature above 1200° F.; its adhesion to iron or steel amounts to about 110 pounds per square inch; it has a suitable thermal coefficient of expansion as is indicated by such adhesion; it is not affected by ocean spray nor high humidity nor does it sweat; its electrical conductivity is nil, it has high heat insulating qualities; it does not absorb water easily since on soaking in water for one hour it absorbs only seven percent of its own weight, and it is neutral since its pH is 7.4 which corresponds to the hydrogen ion concentration of neutrality.

*Example 2*

The coating composition comprises Vitrex sodium silicate cement powder made by the Atlas Mineral Products Company, Mertztown, Pennsylvania, as the solid component, and the waterglass described above as the liquid component. The Vitrex powder analysis is:

|  | Per cent |
|---|---|
| $SiO_2$ | 92.20 |
| $Al_2O_3$ | 1.74 |
| FeO | 0.70 |
| CaO | 2.02 |
| MgO | 1.04 |
| BaO | 0.44 |
| Ignition loss | 2.05 |
| Total | 100.19 |

The Vitrex powder is best mixed with one half its weight of the waterglass. It is best to add about two-thirds of the powder and mix it intimately with the waterglass, and then stir in the remaining one-third until air bubbles are eliminated. The mixture is then ready for application to iron boiler plate or to any part of the iron or steel construction. A layer of about one thirty-second of an inch is applied in any suitable manner to the part to be protected, and allowed to set for about two hours. This constitutes the binder or foundation coat.

Another mixture is made of the same ingredients, in the same proportions, and in the same manner, as that for the binder or foundation coat, and to it is added asbestos, preferably powdered and of the grade known as 7R, and preferably in an amount equal to that of the Vitrex powder used. Just enough of the waterglass is also added to give the mixture the proper consistency for applying it. It is applied over the first coating which has set for about two hours, in sufficient quantity to make the total thickness of both coats from about one sixteenth to one eight of an inch. This is allowed to dry and cure for about seventy-two hours. It is then sprayed with a twenty percent aqueous hydrochloric acid, and then allowed to dry for twelve hours, whereupon the coating is completed. The outer or mastic coat is neutral, although it was on the alkaline side, having a pH of 10.6, before the acid was applied thereto.

The completed coating is fireproof and will not burn, burst into flame, smolder, nor give off objectionable fumes. It adheres well to the metal, and forms a tough coating which does not chip away even when a center punch is driven through a coated metal plate from the uncoated side nor when a coated plate is dropped from a considerable height onto a cement floor. The coating is satisfactory for and resists temperatures up to and above 1500° F., and vitrified only slightly at a temperature of 2030° F. A plate exposed to such a temperature was soaked in water and dried, and the coating remained intact. The coating absorbed only about nine percent of water on soaking therein. When a plate coated on one side was placed in a steam bath, there was no sweating or condensation on the surface of the coating, but there was heavy condensation on the uncoated side. The coating adhered strongly to iron or steel, has a suitable thermal coefficient of expansion, is not affected by ocean spray nor high humidity, its electrical conductivity is nil, and it has high insulating qualities.

The coatings of both examples are quick setting and inert to alkalies of any concentration and to all acids except hydrofluoric acid, and they present waterproof surfaces.

Certain details have been referred to for the purpose of describing the invention and may be varied without departing from its spirit.

Having thus described my invention, what I claim and desire to secure by Letters Patent is:

1. Iron or steel having an inner binder coat thereon and an outer mastic coat on said binder coat, said binder coat comprising a set mixture of silica, calcined dolomite, calcium fluoride, and sodium silicate, said mastic coat comprising a set mixture of silica, calcined dolomite, calcium fluoride, sodium silicate, and asbestos, at least the outer surface of said mastic coat being substantially non-alkaline.

2. The process of forming on iron or steel a fireproof, waterproof, non-sweating, insulating, adherent coating, which comprises applying a coating of a mixture of silica, calcined dolomite, calcium fluoride and waterglass thereto, allowing the applied coating to cure partially, applying to the partially cured coating a coating of a mixture of silica, calcined dolomite, calcium fluoride, asbestos, and waterglass, allowing both applied coatings to cure, applying acid spray to the outer wall of the second mentioned coating, and allowing the acid to react.

3. The process of forming on iron or steel a fireproof, waterproof, non-sweating, insulating, adherent coating having a substantially neutral surface, which comprises slowly adding, with constant stirring, a mixture of about 1.8 lbs. of silica, about 0.125 lb. of calcined dolomite, and about 0.125 lb. of calcium fluoride, said components in finely divided form and said silica having a fineness of minus 200 mesh, to about 1.015 lbs. of sodium silicate solution of about 38° Bé. to form a thick paste, adding more of said solution thereto slowly with constant stirring until the paste has the proper consistency for spraying, spraying the resulting mass onto iron or steel, making a paste similarly to that above referred to, adding thereto an amount of asbestos equal to about 10 percent of the weight of said paste, adding more of said solution thereto with constant stirring until the paste has again assumed the aforesaid consistency, spraying the resulting mass onto said first mentioned coating after said coating has stood for about one hour, allowing both coatings to stand for about seventy-two hours, spraying the outer surface of the applied coating with diluted hydrochloric acid, and allowing the coating to stand for about twenty-four hours.

4. Iron or steel having an inner binder coat thereon and an outer mastic coat on said binder coat, said binder coat comprising a set mixture of sodium silicate and materials whose proportions by weight are about 1⅘ parts silica, ⅛ part calcined dolomite, and ⅛ part calcium fluoride, said binder coat comprising by weight about 2 parts of said materials to 1 part of the sodium silicate, said mastic coat comprising a set mixture of silica, calcined dolomite, calcium fluoride, and sodium silicate, at least the outer surface of said outer coat being substantially neutral.

5. Iron or steel having an inner binder coat thereon and an outer mastic coat on said binder coat as defined in claim 4, wherein the proportions of the materials in said mastic coat and the proportions of such materials to sodium silicate are substantially the same as said binder coat.

6. Iron or steel having a coating thereon comprising a set mixture of sodium silicate and materials whose proportions by weight are about 1⅘ parts of silica, ⅛ part calcined dolomite, and ⅛ part calcium fluoride, the proportions by weight of said materials being about 2 parts to 1 part of the sodium silicate.

EDWARD ROACH.

REFERENCES CITED

The following references are of record in the file of this patent:

UNITED STATES PATENTS

| Number | Name | Date |
|---|---|---|
| 63,087 | Pelletier | Mar. 19, 1867 |
| 97,767 | Douglas | Dec. 14, 1869 |
| 449,214 | Enricht | Nov. 31, 1891 |
| 466,325 | Claus | Jan. 5, 1892 |
| 472,033 | Claus | Apr. 5, 1892 |
| 897,939 | Tyc et al. | Sept. 8, 1908 |
| 1,256,455 | Eyer | Feb. 12, 1918 |
| 1,761,343 | Holzapfel | June 3, 1930 |
| 2,016,796 | Brock et al. | Oct. 8, 1935 |
| 2,162,387 | Rodabaugh | June 13, 1939 |

FOREIGN PATENTS

| Number | Country | Date |
|---|---|---|
| 5,291 | Great Britain | 1895 |
| 14,563 | Australia | 1934 |
| 27,191 | Great Britain | 1904 |
| 36,966 | Germany | 1886 |
| 410,085 | Great Britain | 1934 |
| 414,009 | France | 1910 |
| 440,281 | France | 1912 |
| 485,943 | Great Britain | 1938 |